US012688693B2

(12) United States Patent
Morgan

(10) Patent No.: US 12,688,693 B2
(45) Date of Patent: Jul. 21, 2026

(54) ACTUATING PLUMBING SYSTEMS BASED ON SURVEILLANCE DATA

(71) Applicant: Barrett Morgan, Salt Lake City, UT (US)

(72) Inventor: Barrett Morgan, Salt Lake City, UT (US)

( * ) Notice: Subject to any disclaimer, the term of this patent is extended or adjusted under 35 U.S.C. 154(b) by 460 days.

(21) Appl. No.: 18/194,533

(22) Filed: Mar. 31, 2023

(65) Prior Publication Data

US 2023/0316764 A1 Oct. 5, 2023

Related U.S. Application Data

(60) Provisional application No. 63/362,291, filed on Mar. 31, 2022.

(51) Int. Cl.
| | |
|---|---|
| *G06V 20/52* | (2022.01) |
| *G06V 10/25* | (2022.01) |
| *G06V 10/82* | (2022.01) |
| *G06V 40/10* | (2022.01) |
| *G06V 40/16* | (2022.01) |

(52) U.S. Cl.
CPC .............. *G06V 20/52* (2022.01); *G06V 10/25* (2022.01); *G06V 10/82* (2022.01); *G06V 40/103* (2022.01); *G06V 40/172* (2022.01)

(58) Field of Classification Search
CPC ........ G06V 20/52; G06V 10/25; G06V 10/82; G06V 40/103; G06V 40/172
See application file for complete search history.

(56) References Cited

U.S. PATENT DOCUMENTS

| | | | | |
|---|---|---|---|---|
| 10,657,795 | B1 * | 5/2020 | Laurans | G07C 9/33 |
| 11,232,666 | B1 * | 1/2022 | Kerzner | H04N 7/181 |
| 2004/0024851 | A1 * | 2/2004 | Naidoo | H04L 67/125 |
| | | | | 709/219 |
| 2006/0045354 | A1 * | 3/2006 | Hanna | G08B 13/19613 |
| | | | | 382/224 |
| 2016/0300476 | A1 * | 10/2016 | Kasmir | H04N 7/186 |
| 2019/0073885 | A1 * | 3/2019 | Bess | H04L 63/302 |
| 2019/0295207 | A1 * | 9/2019 | Day | G09F 13/005 |
| 2019/0304274 | A1 * | 10/2019 | Britton | G07C 9/25 |
| 2020/0184227 | A1 * | 6/2020 | Felhi | G06V 40/50 |

(Continued)

FOREIGN PATENT DOCUMENTS

| | | | | |
|---|---|---|---|---|
| IN | 202141026147 | A | * | 6/2021 |
| JP | 2005208833 | A | * | 8/2005 |

OTHER PUBLICATIONS

Multipurpose Surveillance System. Sudheer et al. (Year: 2022).*

*Primary Examiner* — Delomia L Gilliard
(74) *Attorney, Agent, or Firm* — TechLaw Ventures, PLLC; Terrence J. Edwards

(57) ABSTRACT

Communications between an onsite surveillance system and a plumbing system for actuating one or more components of the plumbing system based on data sensed by the onsite surveillance system. A method includes receiving an image frame from a surveillance camera and identifying an object of interest within the image frame. The method includes instructing a plumbing controller to actuate one or more components of a plumbing system in response to determining that the object of interest depicts a non-authorized person located at the property and/or receiving an indication from a user that the non-authorized person is located at the property.

20 Claims, 10 Drawing Sheets

(56)                    References Cited

U.S. PATENT DOCUMENTS

| | | | |
|---|---|---|---|
| 2021/0209392 A1* | 7/2021 | Pang | G06V 10/454 |
| 2021/0360446 A1* | 11/2021 | Laurans | H04N 23/611 |
| 2022/0101676 A1* | 3/2022 | Kerzner | G07C 9/37 |
| 2022/0157138 A1* | 5/2022 | Metzler | G05D 1/0094 |
| 2024/0184868 A1* | 6/2024 | Khadloya | G06V 40/172 |

* cited by examiner

224

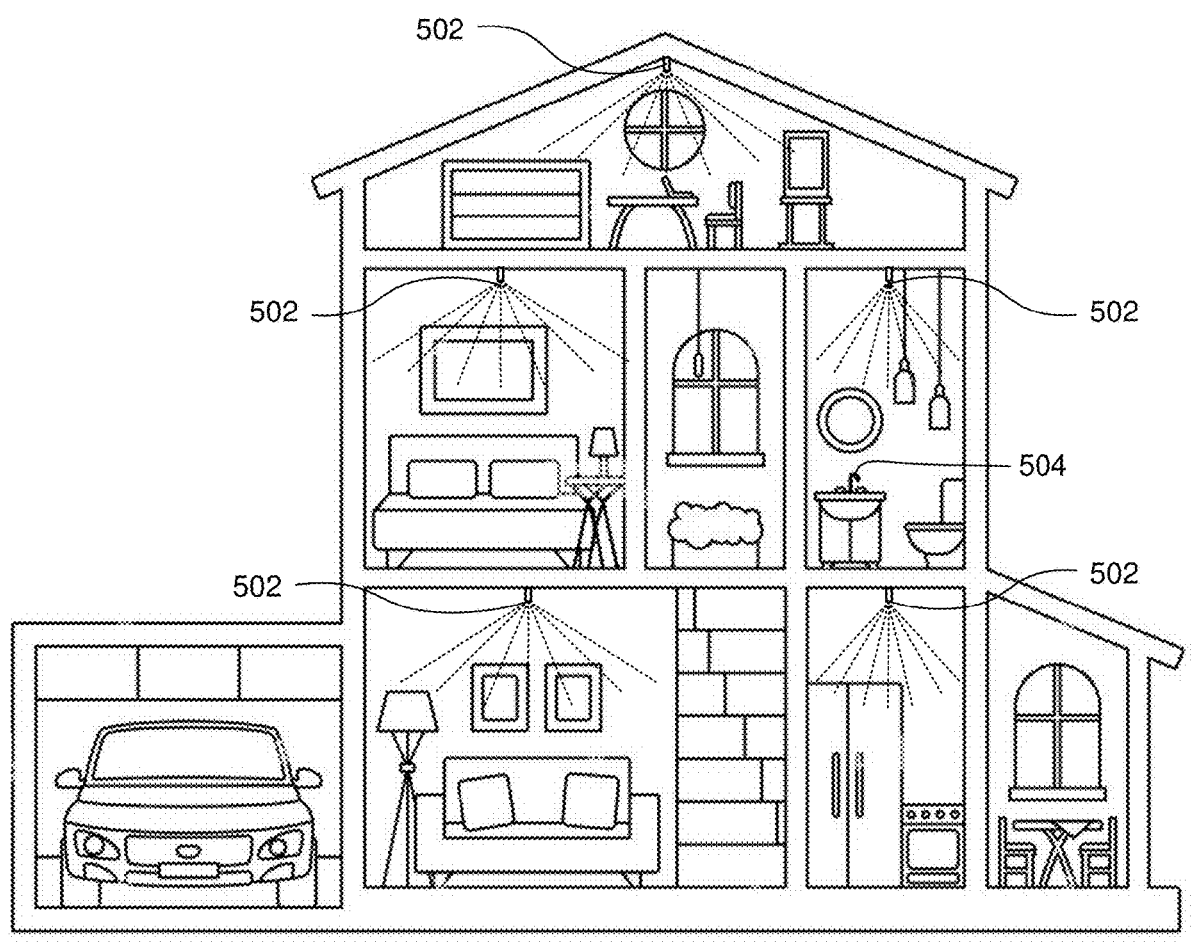
FIG. 5

600

700

```
┌─────────────────────────────────────────────────────────────────┐
│    Receiving An Indication That An Object Of Interest Is          │
│    Detected In Sensor Data.                                       │
│                          702                                      │
└─────────────────────────────────────────────────────────────────┘
                               │
                               ▼
┌─────────────────────────────────────────────────────────────────┐
│    Retrieving Real-Time Sensor Data From A Surveillance System    │
│    At A Property.                                                  │
│                          704                                      │
└─────────────────────────────────────────────────────────────────┘
                               │
                               ▼
┌─────────────────────────────────────────────────────────────────┐
│    Providing An Image From The Real-Time Sensor Data To A Neural  │
│    Network Trained To Classify The Object Of Interest Depicted    │
│    Within The Image.                                              │
│                          706                                      │
└─────────────────────────────────────────────────────────────────┘
                               │
                               ▼
┌─────────────────────────────────────────────────────────────────┐
│    Receiving From The Neural Network An Identity Classification   │
│    Of The Object Of Interest.                                     │
│                          708                                      │
└─────────────────────────────────────────────────────────────────┘
                               │
                               ▼
┌─────────────────────────────────────────────────────────────────┐
│    In Response To Determining The Object Of Interest Is A Person, │
│    Verifying Whether The Person Is Authorized To Be At The        │
│    Property Based On A Log Of Authorized Persons.                 │
│                          710                                      │
└─────────────────────────────────────────────────────────────────┘
                               │
                               ▼
┌─────────────────────────────────────────────────────────────────┐
│    In Response To Determining The Person Is Not Authorized To Be  │
│    At The Property, Providing Instructions To A Plumbing          │
│    Controller To Actuate One Or More Components Of A Plumbing      │
│    System.                                                        │
│                          712                                      │
└─────────────────────────────────────────────────────────────────┘
```

FIG. 7

800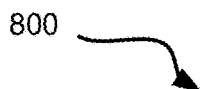

Receiving An Image Frame From A Surveillance Camera, Wherein The Surveillance Camera Is A Component Of A Surveillance System For A Property.
802

Identifying An Object Of Interest Within The Image Frame.
804

Determining Whether The Object Of Interest Depicts A Non-Authorized Person That Is Not Currently Authorized To Be Located At The Property By Cross-Checking The Object Of Interest Against A Listing Of Authorization Parameters.
806

Instructing A Plumbing Controller To Actuate One Or More Components Of A Plumbing System In Response To One Or More Of: Determining The Object Of Interest Depicts The Non-Authorized Person Located At The Property, Or Receiving An Indication From A User That The Non-Authorized Person Is Not Currently Authorized To Be Located At The Property.
808

FIG. 8

ACTUATING PLUMBING SYSTEMS BASED ON SURVEILLANCE DATA

TECHNICAL FIELD

The disclosure relates generally to computer-based communications and particularly to communications between surveillance systems and plumbing systems. The disclosure also relates to actuating at least a portion of the plumbing system based on surveillance data as a deterrent to unwanted.

BACKGROUND

It is becoming increasingly common for property owners to deploy surveillance systems to monitor and protect their property. Surveillance systems may include cameras, motion sensors, speakers, microphones, and other devices to determine whether an intruder has entered a property. Surveillance systems may be used to monitor indoor and outdoor spaces at a property and may be configured to alert a property owner or law enforcement authority when an intruder enters the property. However, surveillance systems typically do a poor job of deterring an intruder from entering the property or quickly forcing a trespasser to leave the property. Therefore, what is needed are systems, methods, and devices for deterring an intruder from entering or remaining on a property in real-time, even when the property owner is not present at the property.

Considering the foregoing, disclosed herein are systems, methods, and devices for facilitating communications between a surveillance system and a plumbing system, such that one or more components of the plumbing system may be actuated in response to data received from the surveillance system.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIG. 5 is a schematic illustration of an example home interior comprising plumbing actuators;

FIG. 7 is a schematic flow chart diagram of a method for actuating a plumbing system in response to determining a person is located at a property and is not authorized to be located at the property;

FIG. 8 is a schematic flow chart diagram of a method for actuating a plumbing system in response to determining a person is located at a property and is not authorized to be located at the property.

DETAILED DESCRIPTION

Figure 1:
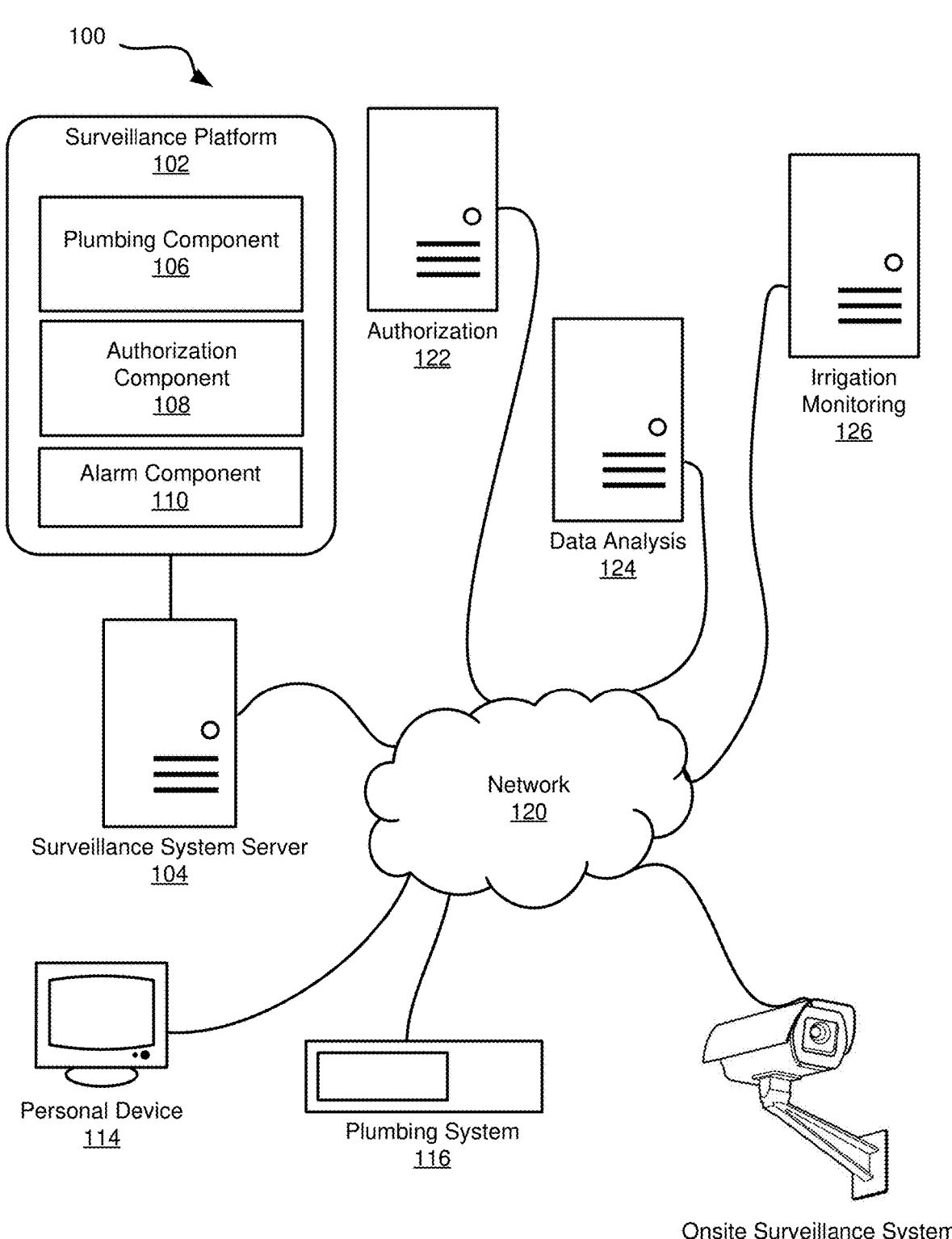
FIG. 1 is a schematic diagram of a system for facilitating communications between a surveillance platform and a plumbing system.

Disclosed herein are systems, methods, and devices for actuating one or more components of a plumbing system based on data received from a surveillance system. The systems, methods, and devices disclosed herein may be executed by a central surveillance server in communication with one or more sensors or devices associated with a surveillance system, and further in communication with a controller for opening and closing components of a plumbing system. The disclosures presented herein may apply to indoor and outdoor plumbing systems and may specifically be implemented to actuate irrigation components such as sprinklers, drip lines, pipes, and hoses, or indoor plumbing components or fixtures, including faucets, showers, and the like.

In an implementation disclosed herein, a surveillance system server determines that a non-authorized person is located on a property. The non-authorized person may include, for example, a trespasser, prowler, lurker, or other un-authorized person. In some implementations, the non-authorized person is a known individual that is not welcome at the property, such as, for example, a patron that has been banned from a business, a person involved in a dispute, a person with a restraining order enacted against them, and so forth. The non-authorized animal may include a pet or wildlife animal that is not welcome on the property. The surveillance system server determines that the person is non-authorized based on real-time sensor data received from an onsite surveillance system. The surveillance system server cross-checks a log of authorized persons to determine whether the person currently located at the property is in fact authorized to be located at the property at the current time. In response to determining the non-authorized person is not authorized to be located at the property at the current time, the surveillance system server communication with a plumbing system and provides instructions to the plumbing system to actuate one or more components of the plumbing system. The plumbing system may then open and/or close one or more indoor and/or outdoor valves to deter the non-authorized person from remaining at the property. The plumbing system may specifically turn on irrigation and/or pluming components to immediately deter the un-authorized person from remaining on the property.

Many property owners have a surveillance system of some kind. Numerous surveillance systems exist in the market with varying degrees of security. Surveillance systems may include outdoor cameras, indoor cameras, doorbell cameras, motion sensors, window sensors, door sensors, noise sensors, heat sensors, cold sensors, moisture sensors, carbon monoxide sensors, fire sensors, smoke sensors, speakers, and so forth. A surveillance system may include an alarm component that might sound an alarm at the property, might send a notification to a monitoring system, might send a notification to the property owner or some other property management company, might notify local law enforcement authorities, might notify local fire authorities, and so forth. Some surveillance systems will automatically send an alert to the property owner (or other authorized individual) each time a sensor is triggered, for example, each time a person is detected in a camera image, each time a motion sensor is triggered, each time a door or window is opened, and so forth. These alerts may be turned off when the system is disarmed, for example when the property owner is at home.

Some surveillance systems create an alert when a person enters the property or is near the property. These alerts can be triggered by motion sensors, door sensors, window sensors, camera image data, and so forth. However, these alerts do not provide an indication of whether the person who has entered the property (or is near the property) is authorized to enter the property. This increases the security risk for the property owner.

The systems, methods, and devices described herein may be useful for reducing the insurance risk when insuring real or movable property. The systems and methods described herein enable a plumbing valve to be opened in response to determining that a non-authorized person is present at the property. This significantly reduces the likelihood that the non-authorized person will remain at the property, and thus reduces the likelihood that the non-authorized person will vandalize the property or take things from the property.

Before the structures, systems, and methods for actuating plumbing components based on surveillance data are disclosed and described, it is to be understood that this disclosure is not limited to the structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the phrase "non-authorized person" and grammatical equivalents thereof refer to persons, animals, or devices present at the property that are not currently authorized to be located at the property. This may include any person located at the property within a specified period, any person that is not a resident at the property or otherwise explicitly authorized to be at the property, or any person that has explicitly been classified as non-authorized. This may additionally include any vehicle present at the property that is not currently authorized to be located at the property.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Referring now to the figures, FIG. 1 is a schematic diagram of a system 100 for facilitating communications between a surveillance system and a plumbing system. The plumbing system may include an indoor plumbing system and/or an outdoor plumbing system. The indoor plumbing system may include one or more of a fire suppression system, water heater, faucet, shower, bathtub, water filtration system, plumbing fixtures and so forth. The outdoor plumbing system may include one or more of a landscaping irrigation component such as a sprinkler or drip line, hose, outdoor shower, outdoor faucet, and so forth. The system 100 can be implemented with any suitable surveillance system. The system 100 may be implemented to actuate one or more plumbing components when an un-authorized person trespasses a property.

The system 100 includes a surveillance platform 102 executed by a surveillance system server 104 that is in communication with a network 120. Access to the network 120 may be provided onsite at a property, such as a residence, commercial building, land, or other real property, by way of a network connection connected to the surveillance system server 104 and/or individual devices such as an onsite surveillance system 112, a personal device 114, and/or a plumbing system 116. The surveillance system server 104 is in communication with one or more personal devices 114 such as smart phones, tablets, mobile phones, laptops, desktop computers, gaming consoles, and so forth. The surveillance system server 104 is additionally in communication with one or more plumbing systems 116 and one or more components or controllers of an onsite surveillance system 112.

The onsite surveillance system 112 includes one or more components for monitoring a property. The onsite surveillance system 112 may be directly or indirectly in communication with the surveillance system server 104 by way of the network 120. The onsite surveillance system 112 includes various surveillance devices, systems, and components, including, for example, cameras, network video recorders, digital video recorders, motion sensors, glass break detectors, audio sensors, door sensors, image sensors, light sensors, window sensors, smoke detectors, carbon monoxide detectors, heat sensors, temperature sensors, moisture sensors, water leak sensors, controllers, speakers and so forth.

The onsite surveillance system 112 includes one or more controllers or control panels. The onsite surveillance system 112 may include one or more primary control panels (may be referred to as a "controller" as used herein) where information applicable to the surveillance system is relayed and processed. The one or more primary control panels may each communicate with the network 120 to provide information and data to one or more servers associated with the onsite surveillance system 112. The one or more primary control panels may directly communicate with the surveillance system server 104. In an implementation, the onsite surveillance system 112 includes a single primary control panel, and all surveillance devices (e.g., cameras, sensors, detectors, and so forth) communicate with the single primary control panel. In various other implementations, the onsite surveillance system 112 may include a plurality of different primary control panels, and different surveillance devices may each communicate with one or more of the plurality of different primary control panels.

The surveillance system server 104 communicates with one or more of the controllers associated with the onsite surveillance system 112. In an implementation wherein the onsite surveillance system 112 includes a plurality of different controllers for monitoring and communicating with different surveillance devices, the surveillance system server 104 may communicate with each of the plurality of different controllers. It should be appreciated that the onsite surveillance system 112 may include a single controller for monitoring all surveillance devices, and the surveillance system server 104 may communicate with the single controller.

The controller for the onsite surveillance system 112 and the surveillance system server 104 bidirectionally communicate with one another by way of the network 120. The onsite surveillance system 112 may directly upload data to the surveillance system server 104. Alternatively, the onsite surveillance system 112 may upload data to a third-party surveillance server, and then the third-party surveillance server may communicate with the surveillance system server 104. The onsite surveillance system 112 may provide a real-time notification to the surveillance system server 104 when there is a high likelihood that an intruder or non-authorized individual is present at the property.

The onsite surveillance system 112 may include one or more access control units. Each access control unit may communicate with one or more primary control panels. The access control unit includes one or more of a display, a button, a dial, a touch screen, and so forth, such that a user may interact with the access control unit. The access control unit may render a user interface that enables a user to monitor the onsite surveillance system 112, make changes to the onsite surveillance system 112, initiate firmware and software updates for various components of the onsite surveillance system 112, arm and/or disarm the onsite surveillance system 112, and so forth.

The onsite surveillance system 112 may be independently controlled, managed, and monitored by a third-party surveillance entity. The surveillance system server 104 may communicate with the third-party surveillance entity by way of an Application Program Interface (API) or other communication protocol. The third-party surveillance entity may provide a notification to the surveillance system server 104 when the third-party surveillance entity suspects there is an intruder or non-authorized individual present at the property. The surveillance system server 104 may then communicate with the plumbing system 116 to actuate one or more plumbing components located at the property based on the information received from the third-party surveillance entity.

The plumbing system 116 is located onsite at the same property associated with the onsite surveillance system 112. The property may include a residential property, commercial property, land, publicly owned property, government property, military property, and so forth. The plumbing system 116 includes one or more of an indoor plumbing system and an outdoor plumbing system. The indoor plumbing system includes one or more devices, systems, and components that can be remotely actuated by a plumbing controller. These devices, systems, and components may include, for example, a fire suppression sprinkler system, faucet, water heater, valve, pump, filter, and so forth. The components for the indoor plumbing system may be associated with sinks, showers, toilets, hoses, or other water sources. The outdoor plumbing system includes one or more devices, systems, and components that can be remotely actuated by a plumbing controller. These devices, systems, and components may include, for example, outdoor plumbing components such as an outdoor shower, outdoor faucet, hose faucet, and so forth, and further may include an irrigation system including sprinklers, drip irrigation, valves, filters, pressure regulators, injectors, and so forth. The plumbing system 116 may include one or more independently controlled systems, wherein each independently controlled system is in communication with a plumbing controller, and the plumbing controller is in communication with the surveillance system server 104.

The plumbing system 116 bidirectionally communicates with the surveillance system server 104. The plumbing system 116 may directly communicate with a third-party plumbing server, and then the third-party plumbing server may communicate with the surveillance system server 104. The plumbing system 116 may receive instructions from the surveillance system server 104 (directly or through a third-party intermediary) indicating that the plumbing controller should actuate one or more devices or components within the plumbing system 116.

In an example implementation, the surveillance system server 104 receives notification that a non-authorized person is trespassing a property. In this implementation, the surveillance system server 104 may communicate with an irrigation (plumbing) controller that is dedicated to an irrigation system. The surveillance system server 104 may instruct the irrigation controller to open one or more valves within the irrigation system and thereby turn on one or more sprinklers, drip lines, and so forth. This may immediately deter the non-authorized person from continuing to trespass on the property.

The personal device 114 is any personal computing device that can communicate with the surveillance system server 104, the onsite surveillance system 112, and/or the plumbing system 116. The personal device 114 may include a smart phone, tablet, laptop, desktop computer, gaming console, smart glasses, web browser, and so forth. Personal devices 114 may communicate with the surveillance system server 104 by way of a local area network (LAN), wide area network (WAN), or another network connection. In an embodiment, personal devices 114 can connect to a network 120, such as a cloud computing network or the Internet, by way of a network connection. The personal device 114 may display a user interface rendered by the surveillance system server 104, the plumbing system 116, and/or the onsite surveillance system 112. The user interface may enable the user to view data associated with the plumbing system 116 and/or the onsite surveillance system 112 and may further enable the user to implement settings for automatically actuating one or more components of the plumbing system 116 based on data from the onsite surveillance system 112.

The system may further include an authorization server 122 in communication with the surveillance system server 104 by way of the network 120. The authorization server 122 may be located offsite at a location that is remote to the property. The authorization server 122 may include a log of authorized persons who are authorized to enter the property. As discussed herein, a "person" may refer to a human being, an animal, a vehicle, a robotic device, or other entity as deemed necessary in the implementation. The log of authorized persons who are authorized to enter the property may include, in one example implementation, persons who live at the property, relatives and/or friends of persons who live at the property, licensed real estate professional who may provide access to people viewing the property, persons who work at the property, persons with limited-time access to the property, contractors working at the property, and so forth. The log of authorized persons may include an indication of specific dates, times, or durations of time that each of the persons is authorized to enter the property.

The authorization server 122 may be in communication with a network 120 such as a cloud computing network. In an embodiment, the surveillance system server 104 is in communication with the authorization server 122 by way of the network 120 such that new profiles of authorized persons may be uploaded from the authorization server 122 to the surveillance system server 104. In an embodiment, a single server includes the information stored in the authorization server 122 and the surveillance system server 104. In an embodiment, the information stored in the authorization server 122 includes sensitive information such as personally identifiable information, and the information is therefore encrypted and safeguarded.

The system may further include a data analysis server 124 in communication with (or incorporated within) the surveillance system server 104. The data analysis server 124 includes processing and storage requirements for performing real-time data analysis on data captured by the onsite surveillance system 112. The data analysis server 124 receives data directly from the onsite surveillance system 112 and/or indirectly by way of the surveillance system server 104. The data analysis server 124 performs real-time analysis of images, videos, audio recordings, noise sensor outputs, moisture sensor outputs, door sensor outputs, window sensor outputs, motion sensor outputs, and so forth. The data analysis server 124 determines whether a person has tripped the onsite surveillance system 112, for example, by opening a door or window when the onsite surveillance system 112 is armed, or by being captured by a camera, motion sensor, or audio sensor located on the property. The data analysis server 124 further determines an identity of a person captured in an image or video stream captured by the onsite surveillance system 112.

The data analysis server 124 includes an image analysis component that is executed by a neural network or machine learning algorithm. The image analysis component executes facial recognition algorithms on images and video streams captured by the onsite surveillance system 112. The image analysis component calculates a confidence score that an image likely depicts a known person who is authorized to enter the property. The data analysis server 124 may communicate with the authorization server 112 to receive one or more images of each person on the log of authorized persons. The image analysis component will become increasingly accurate and efficient at identifying authorized persons as the onsite surveillance system 112 continues to capture images of the authorized persons, and those images are fed to the image analysis neural network.

The system 100 may further include an irrigation monitoring server 126 in communication with the surveillance system server 104 by way of the network 120. The irrigation monitoring server 126 may be a third-party entity in communication with one or more of the plumbing systems 116. The irrigation monitoring server 126 is specifically in communication with an irrigation system comprising sprinklers, drip lines, hoses, valves, pressure regulators, filters, and adapters for providing irrigation water to a landscape. The irrigation monitoring server 126 may provide rules to the surveillance system server 104 indicating that the property owner is not allowed to activate the irrigation system on certain dates or times. These rules may be received from a government agency or other regulatory agency that monitors the use of water in the region where the property is located.

The surveillance platform 102 includes one or more of a plumbing component 106, an authorization component 108, and an alarm component 110. The surveillance platform 102 may include further components and may be configured to perform additional instructions.

The plumbing component 106 of the surveillance platform 102 communicates with the plumbing system 116 to actuate one or more plumbing components based on data received from the onsite surveillance system 112. For example, the surveillance system server 104 may receive data from the onsite surveillance system 112 indicating that a non-authorized person is trespassing an outdoor space of a property. In response to receiving this data, the plumbing component 106 generates instructions indicating that one or more irrigation components should be turned on at the property. The plumbing component 106 provides these instructions to the plumbing system 116 controller, and the controller then causes the one or more irrigation components to open. The plumbing component 106 may specifically identify one or more irrigation zones that should be actuated based on where the non-authorized person is located on the property.

The authorization component 108 of the surveillance platform 102 determines whether a person, animal, or vehicle (may generically be referred to as a "person" herein) is authorized to be present at the property. The authorization component 108 receives data from the onsite surveillance system 112, including, for example, images, video streams, audio recordings, motions sensor data, sound sensor data, temperature sensor data, and so forth. The authorization component 108 communicates with the data analysis server 124 (in an embodiment, the data analysis server 124 is a component of the authorization component 108) to identify objects of interest within the data captured by the onsite surveillance system 112. The authorization component 108 determines whether any of the objects of interest captured by the onsite surveillance system 112 have been pre-authorized to be present at the property.

If the data captured by the onsite surveillance system 112 includes an image, the data analysis server 124 executes a machine learning algorithm to identify one or more objects of interest within the image such as persons, animals, vehicles, and so forth (each of these categories may be generically referred to as a "person" herein). The data analysis server 124 draws a bounding box around each object of interest and then performs further analysis on the image data within the bounding box. The data analysis server 124 executes a facial recognition machine learning algorithm to calculate a confidence score for a predicted identity of each object of interest within the image. The data analysis server 124 compares image data for the objects of interest captured by the onsite surveillance system 112 with stored image data received from the authorization server 122. The data analysis server 124 calculates a confidence score that a person depicted in data captured by the onsite surveillance system 112 is the same person that has been pre-authorized to be at the property according to the log of authorized persons or animals stored on the authorization server 122. In some implementations, the data analysis server 124 executes a machine learning algorithm to read a license plate number or determine a vehicle make or model to determine whether a non-authorized vehicle is present at the property. In some implementations, the data analysis server 124 executes a machine learning algorithm to classify an animal depicted within image data, and then the authorization component 108 determines whether the particular animal or animal-type is authorized at the property.

The authorization component 108 refers to the log of authorized persons stored on the authorization server 122 to determine whether a person at the property is authorized. If the person is authorized to be at the property, the authorization component 108 may send a notification to a user associated with the surveillance platform 102 and request the user to confirm whether the person is authorized to be located at the property. If the person is not authorized to be at the property, the authorization component 108 may automatically generate a notification indicating that the plumbing component 106 should cause one or more components of the plumbing system 116 to open. If the person is not authorized to be at the property, the authorization component 108 may send a notification to a user associated with the surveillance platform 102 and request the user to confirm whether the person is not authorized to be located at the property and may further request the user to indicate whether any component of the plumbing system 116 should be actuated.

The authorization component 108 may refer to a log of persons that have been explicitly classified as non-authorized. In this implementation, the authorization component 108 may presume that all persons are authorized other than those on the non-authorized list. The non-authorized list might include, for example, persons that have been banned from a certain business or property, persons with a restraining order against them, persons involved in a dispute that are not allowed on the property, and so forth. Again, the authorization component 108 may identify these non-authorized persons based on surveillance data.

The alarm component 110 of the surveillance platform 102 may activate one or more alarms or notifications in response to a non-authorized person entering the property. The alarm component 110 may ensure that sensors remain active while the non-authorized person is at the property and may further activate one or more noise-emitting alarms, notifications to law enforcement, notifications to monitoring agencies, and so forth, while the non-authorized person is at the property. The alarm component 110 may trigger a notification to be sent to the property manager or property owner indicating that a non-authorized person has entered the property. The alarm component 110 may activate an alarm indicating that the one or more components of the plumbing system 116 have been actuated directly in response to the non-authorized person being on the property.

The alarm component 110 may provide a means for a person to input a code (e.g., numerical, alphanumerical, or biometric code) to deactivate an alarm response. The alarm component 110 may render a user interface on a controller associated with the onsite surveillance system 112 (or other controller) that enables a user to disarm the onsite surveillance system 112 by inputting a unique code or password. If the person inputs the correct code to deactivate the alarm response, then the alarm component 110 may further cause the one or more components of the plumbing system 116 to close.

The surveillance system server 104 provides access to the surveillance platform 102 to plumbing systems 116, onsite surveillance systems 112, and/or personal devices 114. The surveillance system server 104 may serve as a dedicated server group to support the surveillance platform 102 for all devices (see 112, 114, 116) interacting with the surveillance platform 102.

In an embodiment as illustrated in FIG. 1, the surveillance system server 104 is independent of the authorization server

122, the data analysis server 124, and the irrigation monitoring server 126. This may be desirable in an instance where the surveillance platform 102 connects to a third-party server or database that comprises user profile information for authorized persons, instructions for executing machine learning algorithms for data analysis, and so forth. For example, a third-party service might exist that catalogs user profile information for numerous retail establishments. The surveillance platform 102 may connect with such a third-party service to obtain user profile information. The surveillance platform 102 may receive user profile information from a third-party user profile service by way of the authorization server 122.

In an embodiment (not shown in FIG. 1), the surveillance system server 104 and any one of the authorization server 122, the data analysis server 124, and the irrigation monitoring server 126 are not independent of one another. In such an embodiment, a single server group may include all information necessary for running the surveillance platform 102, including user profile information, payment information, transaction history, data analysis algorithms, and so forth. It should be appreciated that numerous different configurations may be used without departing from the scope of the disclosure.

Figure 2A:
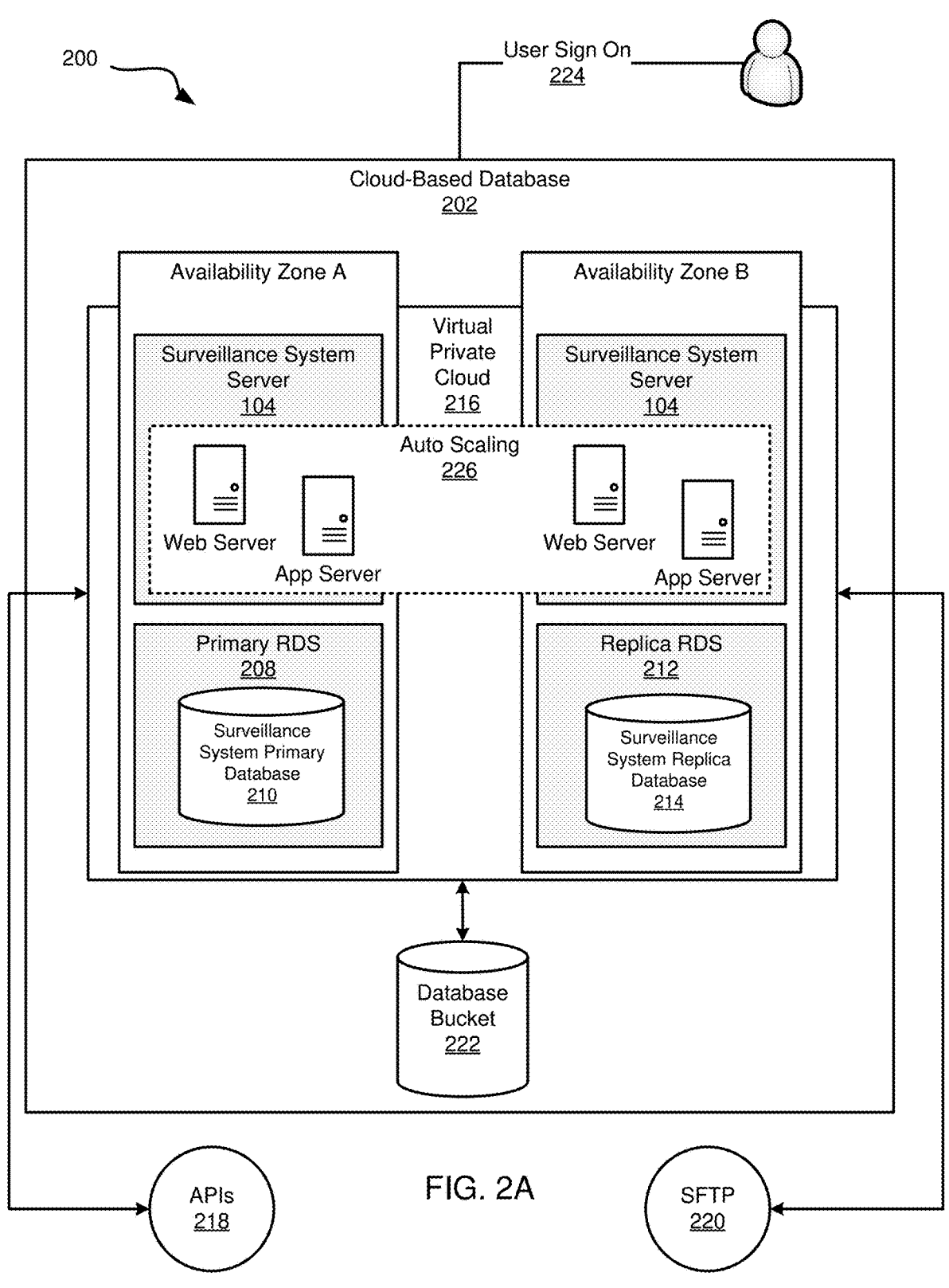
FIG. 2A is a schematic diagram of a cloud-based database comprising fault-tolerant servers for increased data availability and security.

FIG. 2A is a schematic block diagram of a system 200 for facilitating communications between a plumbing system and an onsite surveillance system. The system 200 illustrated in FIG. 2A may be implemented in conjunction with the system 100 illustrated in FIG. 1. The system 200 includes a cloud-based database 202 supporting the surveillance system server 104. The cloud-based database 202 includes an Availability Zone A and an Availability Zone B. The Availability Zone A includes a first instance of the surveillance system server 104 and the Availability Zone B includes another instance of the surveillance system server 104. Each of the instances of the surveillance system server 104 includes a web server and an app server, and the cloud-based database 202 auto-scales the processing and storage resources between the web servers and app servers for the Availability Zone A and the Availability Zone B. The Availability Zone A includes a primary relational database service (RDS) 208 and the Availability Zone B includes a replica relational database service 212. The surveillance system primary database 210 is stored on the primary relational database service 208 and the surveillance system replica database 214 is stored on the replica relational database service 212. The virtual private cloud 216 of the cloud-based database 202 communicates with outside parties by way of Application Program Interfaces 218 and Secure File Transfer Protocol (SFTP) 220 messaging. The cloud-based database 202 includes a database bucket 222 for storing information associated with the surveillance system platform 102. Users interacting the surveillance system platform 102 can sign on 224 to the service by communicating with the cloud-based database 202.

The cloud-based database 202 includes processing and storage resources in communication with the network 120. The cloud-based database 202 includes a resource manager for managing the usage of processing and storage resources. The resource manager of the cloud-based database 202 performs auto scaling 226 load balancing to ensure adequate processing and storage resources are available on demand based on real-time usage.

The availability zones represent discrete datacenters with redundant power, networking, and connectivity for supporting the surveillance system server 104. The availability zones enable the ability to operate production applications and databases in a more universally available, fault tolerant, and scalable way than would be possible with a single datacenter. The Availability Zone A and Availability Zone B are interconnected with high-bandwidth, low-latency networking, over fully redundant, dedicated metro fiber providing high-throughput, low-latency networking between the availability zones. All traffic between the availability zones is encrypted. The network performance of the availability zones is sufficient to accomplish synchronous replication between the availability zones. Applications, modules, components, and processing methods can be partitioned between the availability zones of the cloud-based database 202. When applications are partitioned across the availability zones, the surveillance system server 104 operates with increased protection and isolation from outages that may be caused by a low in power, hardware issues, software issues, and so forth. The availability zones are physically separated by a meaningful geographic distance to ensure the hardware supporting the availability zones will not be impacted by the same outside forces, such as power outages, natural disasters, and so forth.

The virtual private cloud 216 is an on-demand configurable pool of shared resources allocated within the cloud-based database 202. The virtual private cloud 216 provides isolation between different users communicating with the cloud-based database 202, e.g., different facilities, user accounts, and clients in communication with the surveillance system platform 102. The isolation between one virtual private cloud 216 user and all other users of the same cloud is achieved through allocation of a private IP subnet and a virtual communication construction such as a VLAN or a set of encrypted communication channels per user. The virtual private cloud 216 provides isolation between users within the cloud-based database 202 and is accompanied with a VPN function allocated per-user within the virtual private cloud 216. This secures the remote access to the surveillance system platform 102 by way of authentication and encryption. The surveillance system platform 102 is then essential run on a "virtually private" cloud, even if the processing and storage resources are provided by a third-party cloud-based database service, such as Amazon Web Services®.

The auto-scaling 226 is performed by a resource manager of the cloud-based database 202. The resource manager distributes workload between the web servers and the app servers of the various availability zones of the cloud-based database 202. In some cases, one client of the surveillance system platform 102 may consume a large quantity of storage resources and processing resources at a certain time, and the resource manager will allocate different web servers and app servers across the availability zones to ensure the client receives an adequate quantity of storage and processing resources. The auto-scaling 226 is performed in real-time to meet the needs of the surveillance system platform 102.

The primary and secondary relational database services 208, 212 provide a means to access, replicate, query, and write to the surveillance system database instances 210, 214. The surveillance system primary database 210 may include a copy of data associated with the surveillance system platform 102. The surveillance system replica database 214 may include a replica copy of all or some of the data stored on the surveillance system primary database 210. The replicated databases provide fault-tolerance and protect the surveillance system platform 102 from becoming inoperative during a power outage, hardware outage, or natural disaster.

The database bucket 222 provides object storage through a web service interface. The database bucket 222 uses scalable storage infrastructure that can be employed to store any type of object. The database bucket 222 may store applications, software code, backup and recovery, disaster recovery, data archives, data lakes for analytics, and hybrid cloud storage to support the surveillance system platform 102.

Figure 2B:
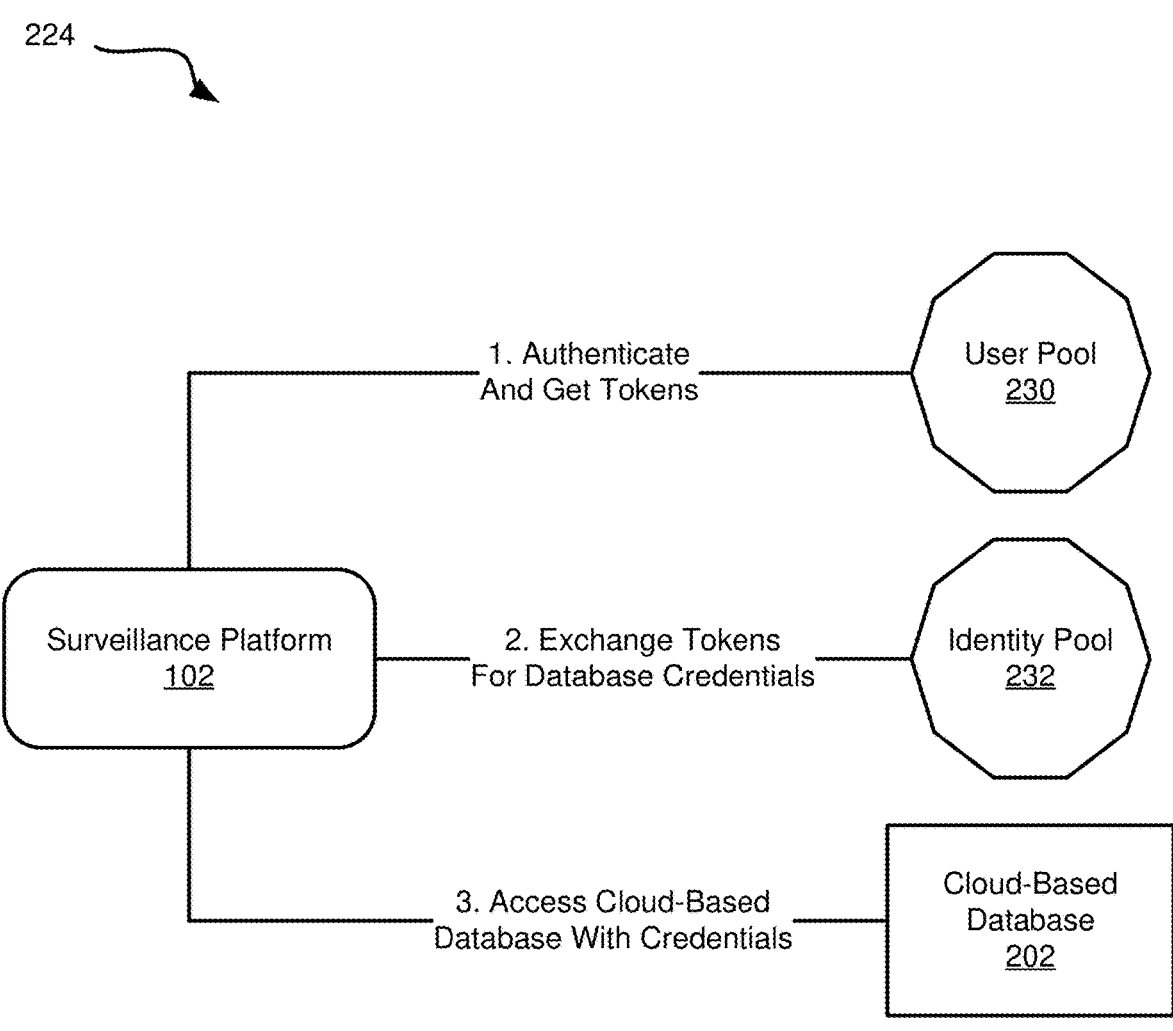
FIG. 2B is a schematic diagram of a system and process flow for signing a user on to a cloud-based database.

FIG. 2B is a schematic block diagram of a system and process flow for accessing the cloud-based database 202 described in FIG. 2A. The surveillance system platform 102 first authenticates and retrieves tokens from a user pool 230. The surveillance system platform 102 then exchanges tokens for database credentials with the identity pool 232. The surveillance system platform 102 is then granted access to the could-based database 202 based upon the credentials.

The user pool 230 is a user directory associated with the cloud-based database 202. With the user pool 230, users can sign into the surveillance system platform 102 through a mobile application, computer-based application, web-based user interface, third-party identity provider, and so forth. Whether users sign in directly or through a third party, all members of the user pool 230 have a director profile that can be accessed. The user pool 230 enables sign-up and sign-in services for the surveillance system platform 102 and further enables social sign-in with outside services, including outside social media networks. The user pool 230 stores a directory, and this directory may be managed, and permissions may be assigned to users within the director.

The identity pool 232 creates temporary credentials to access the cloud-based database 202. The identity pool 232 supports anonymous guest users and social sign-in through outside parties, including third-party social media network.

The system 200 authenticates users by leveraging the user pool 230. After a successful sign-in through the user pool 230, the surveillance system platform 102 creates user pool groups to manage permissions and to represent diverse types of users. The surveillance system platform 102 creates user groups defined by a type of data permission for that group.

The surveillance system platform 102 may access the cloud-based database 202 through an Application Program Interface (API) Gateway. The API Gateway validates the tokens from a successful user pool 230 authentication and uses those tokens to grant users access to the resources within the surveillance system platform 102 and the cloud-based database 202. The surveillance system platform 102 leverages the user groups defined within the user pool 230 to control permissions with the API Gateway by mapping group membership to roles within the user pool 230. The user groups that a user is a member of are included in the identification token provided by a user pool 230 when the user signs into the surveillance system platform 102. The surveillance system platform 102 submits the user pool tokens with a request to the API Gateway for verification by an authorizer for the cloud-based database 202.

In an embodiment, a unique user pool 230 is created for each tenant within the surveillance system platform 102. This approach provides maximum isolation for each tenant and allows the surveillance system platform 102 to implement different configurations for each tenant. Tenant isolation by user pool 230 allows flexibility in user-to-tenant mapping and allows multiple profiles for the same user. Additionally, in this implementation, a unique hosted user interface may be assigned to each tenant independently, and the surveillance system platform 102 will automatically redirect each tenant to their tenant-specific user interface instance.

In an embodiment, a single user may be mapped to multiple tenants without recreating the user's profile within the surveillance system platform 102. In this embodiment, a data package client is executed for each tenant, and this data package client enables the tenant external IdP as the only allowed provider for that data package client. Data package client-based multi-tenancy requires additional considerations for username, password, and more to authenticate users with the native accounts. When the hosted user interface is in use, a session cookie is created to maintain the session for the authenticated user. The session cookie also provides SSO between data package clients in the same user pool 230.

In an embodiment, the surveillance system platform 102 implements role-based access control. The identity pools 232 assign authenticated users a set of temporary, limited-privilege credentials to access the resources in the cloud-based database 202. The permissions for each user are controlled through roles created within the surveillance system platform 102. The surveillance system platform 102 defines rules to choose the role for each user based on claims in the user's identification token. The rules enable the surveillance system platform 102 to map claims from an identity provider token to a role. Each rule specifies a token claim (such as a user attribute in the identification token from the user pool 230), match type, a value, and a role. The match type can be Equals, NotEqual, StartsWith, or Contains. If a user has a matching value for the claim, the user can assume that role when the user gets credentials. For example, the surveillance system platform 102 may create a rule that assigns a specific role for the users with a custom: dept custom attribute value of Sales.

Rules are evaluated in order, and the role for the first matching rule is used, unless a custom role is specified to override the order. The surveillance system platform 102 may set multiple rules for an authentication provider in the identity pool 232. Rules are applied in order. The order of the rules may be altered. The first matching rule takes precedence. If the match type is NotEqual, and the claim does not exist, then the rule is not evaluated. If no rules match, the role resolution setting is applied to either use the default authenticated role or to deny. The surveillance system platform 102 specifies a role within the API connection to the cloud-based database 202 to be assigned when no rules match in the ambiguous role resolution process. For each user pool 230 or other authentication provider configured for an identity pool 232, the surveillance system platform 102 may assign numerous rules.

Figure 3:
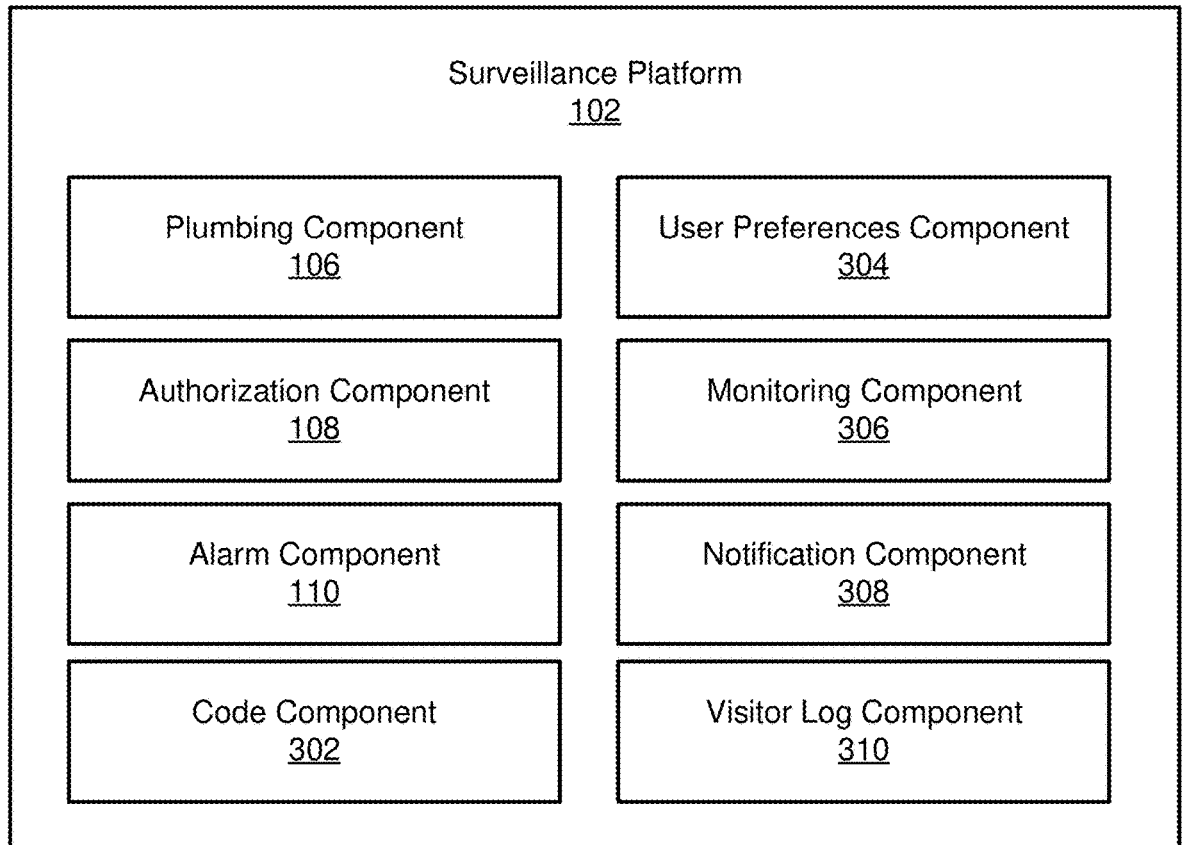
FIG. 3 is a block diagram of components of a surveillance platform.

FIG. 3 is a block diagram of the surveillance platform 102. The surveillance platform 102 includes the plumbing component 106, the authorization component 108, and the alarm component 110 as discussed in FIG. 1. The surveillance platform 102 may further include one or more of the code component 304, the user preferences component 304, the monitoring component 306, the notification component 308, the visitor log component 310, and other components as deemed necessary based on the implementation.

For purposes of illustration, programs and other executable program components are shown herein as discrete blocks, although it is understood that such programs and components may reside at various times in different storage components of a computing device and are executed by one or more processors. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "component" is intended to convey the implementation apparatus for accomplishing a process, such as by hardware, or a combination of hardware, software, and/or firmware, for the purposes of performing all or parts of operations disclosed herein. The terms "component" is intended to convey independence in how the modules, components, or their functionality or hardware may be implemented in different embodiments.

The code component 302 stores information about a code associated with a certain authorized person or account. The code may include a scannable code presentable on, for example, a display of a mobile phone, tablet, and so forth. The scannable code may include a QR code or other suitable code. The code may include a numerical code, alphanumerical password, and so forth. The code may further include a biometrics code such as a fingerprint, pal vein pattern, facial geometry, DNA, palm print, hand geometry, iris recognition, retina, odor, signature, voice, behavioral profile, and so forth. The code may be input directly into a user interface for the surveillance platform 102 and/or the onsite surveillance system 112. The code may be input prior to adding or removing persons from the log of authorized persons, prior to selecting settings for the surveillance platform 102, and prior to disarming or deactivating the onsite surveillance system 112 and/or a plumbing response implemented by the surveillance platform 102.

In an implementation, the code provides an identity of a person. The code may include a unique scannable code or biometric code associated with a person on the log of authorized persons. When the code is scanned, the surveillance platform 102 may determine the identity of the person, cross check the person's identity on the log of authorized persons and determine whether the person is authorized to be on the property at that time.

The user preferences component 304 stores information pertaining to a user's account with the surveillance platform 102. The user preferences component 304 may store information about the property owner or property manager. In an embodiment, the user preferences component 304 stores information about when the property owner is typically home, when the property owner allows others to visit the property, contact information for the property owner, and so forth. The user preferences component 304 stores information about whether the plumbing system 116 should be actuated in response to a person being on the property, and which components of the plumbing system 116 should be actuated. The user preferences component 304 may include time sensitive information indicating that, for example, the property owner will be on vacation and any person on the property will be non-authorized over a certain time.

The monitoring component 306 is in communication with sensors at the property. The monitoring component 306 may estimate whether a person is present at the property based on data received from the sensors at the property. The monitoring component 306 may determine whether a person is currently at the property, where the person is within the property, and whether the authorized person brought guests to the property. This determination may be made based on sensor data indicating, for example, how many people are at the property, where the persons are located within the property, and whether the persons appear to be behaving as prospective buyers touring the property.

The notification component 308 monitors notifications sent to the property owner and/or property manager, law enforcement officials, fire department officials, a monitoring agency or service, and so forth. In an embodiment, the notification component 308 notifies the property owner when an authorized or non-authorized person has entered the property and when the authorized or non-authorized person has departed the property. In an embodiment, the notification component 308 notifies the property owner when the alarm system has been disarmed or armed. In an embodiment, the notification component 308 provides a live video stream of an authorized person at the property, based on sensors in communication with the surveillance platform 102. The notifications component 308 provides an indication of whether any plumbing system 116 components were actuated in response to a person entering the property.

The visitor log component 310 stores a timestamped log of authorized and/or non-authorized persons who have visited the property. The visitor log component 310 may store video, audio, image, and other data in connection with log entries of when persons visited the property.

Figure 4:
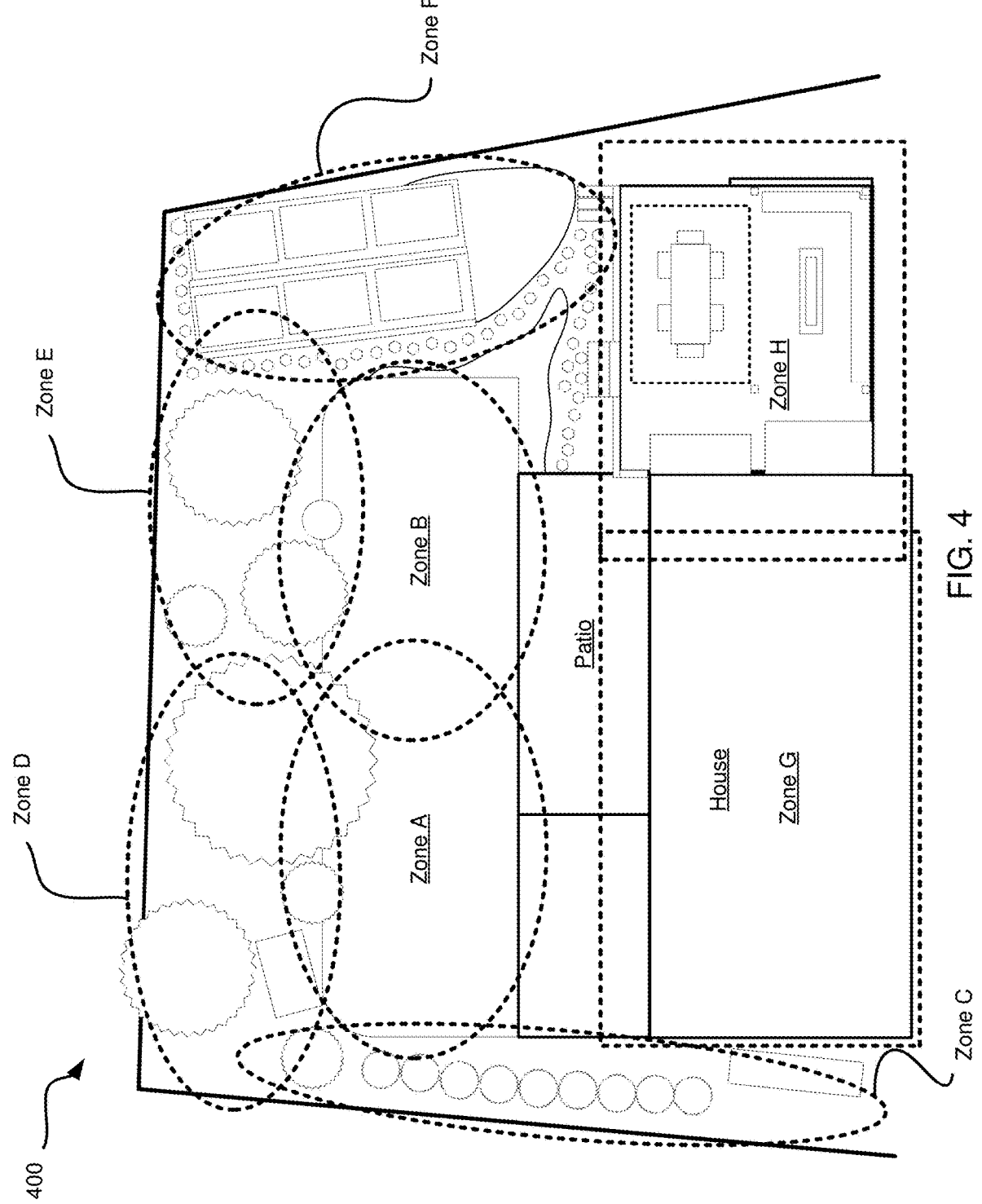
FIG. 4 is a schematic illustration of an example yard comprising a plurality of irrigation zones, wherein each irrigation zone may be independently actuated.

FIG. 4 is a schematic illustration of an example property 400 comprising numerous irrigation zones connected to a plumbing system 116. The property 400 includes six example irrigation zones within a backyard area. The irrigation zones include Zone A, Zone B, Zone C, Zone D, Zone E, Zone F, Zone G, and Zone H. Each of the irrigation zones is independently actuated by a controller for the plumbing system 116.

The surveillance platform 102 identifies one or more irrigation zones to be actuated (turned on or off) in response to data received from the onsite surveillance system 112. In some implementations, and depending on user preference, the surveillance platform 102 identifies where a non-authorized person is located within the property 400. The surveillance platform 102 may determine, based on data output by the data analysis server 124, whether the non-authorized person is located within a certain zone on the property 400. In response to identifying whether the non-authorized person is located, the surveillance system server 104 may open irrigation lines within that specific zone.

In an example implementation, the surveillance system server 104 receives data from the onsite surveillance system 112 comprising images, audio data, and/or motion sensor data for the property 400. The surveillance platform 102 determines there is a non-authorized person located at the property 400. The surveillance platform 102 identifies where the non-authorized person is located based on the data received from the onsite surveillance system 112, whether the non-authorized person is located outdoors on the property 400 or inside the house located on the property 400. The surveillance platform 102 may determine, for example, that the non-authorized person is located inside the house within Zone G and/or Zone H. In response to determining whether the non-authorized person is located, the surveillance platform 102 determines which irrigation zones should be opened or which plumbing components should be turned on or otherwise actuated. The surveillance platform 102 may specifically open (turn on) the valves for plumbing fixtures, such as faucets or showers to indicate to an intruder that an authorized person may be present inside the house. In addition, the surveillance platform 102 may specifically open (turn on) the valves for plumbing fixtures, such as such as faucets, showers, or even fire sprinklers, within Zone G and/or Zone H, for example, in halls or other locations within a building or house because the non-authorized person is located within one or more of Zone G and Zone H.

In another example, the surveillance platform 102 may determine that the non-authorized person is located outdoors on the grass area within Zone A and/or Zone B of the property 400. In response to determining whether the non-authorized person is located, the surveillance platform 102 determines which irrigation zones should be opened. The surveillance platform 102 may specifically open (turn on) the sprinklers within Zone A and Zone B because the non-authorized person is located within Zone A and Zone B.

The surveillance platform 102 may actuate the same plumbing system 116 components regardless of where the non-authorized person is located. In the example property 400 illustrated in FIG. 4, Zones C, D, E, and F (planter beds) may comprise drip irrigation or other irrigation components that do not spray water, while Zones A and B (grass) may comprise sprinklers or other irrigation components that do spray water. In this implementation, the surveillance platform 102 may always actuate the spraying irrigation components within Zones A and B regardless of where the non-authorized person is located.

The surveillance platform 102 may open and close various irrigation components depending on where the non-authorized person is located whether indoors or outdoors. In this embodiment, the surveillance platform 102 may turn on irrigation components in Zone A when the non-authorized person is in Zone A, then turn off those components when the non-authorized person moves to a different zone. The surveillance platform 102 may then turn on the irrigation components in the new zone, if applicable. This implementation may be particularly effective at notifying the non-authorized person that they are being tracked and their position is known on the property 400.

The system 100 described herein may be implemented when a user must operate within the bounds of water usage limits or irrigation restriction protocols. A user may interact with a user interface rendered by the surveillance system server 104 to indicate that the user is only allowed to irrigate on certain dates or at certain times. The surveillance system server 104 may retrieve this information automatically from a third-party irrigation monitoring server 126. The user may indicate whether the surveillance system server 104 is authorized to override irrigation protocols when a non-authorized person is located at the property. In an event wherein the surveillance system server 104 overrides an irrigation protocol, the surveillance system server 104 may store a log indicating that the protocol was overridden solely in the interest of deterring the non-authorized person from remaining on the property.

FIG. 5 is a schematic illustration of an example home interior 500 comprising a plurality of rooms. As shown in FIG. 5, the home interior 500 includes a plurality of plumbing systems, including a fire suppression system 502 and a faucet 504. In the embodiments described herein, the plumbing controller may open and close valves on one or more plumbing components within the home interior 500.

In most cases, the fire suppression system 502 valves are opened through sufficient heat to melt a component within the valves and indicate a first is active in the home. In an implementation as described herein, one or more valves in the fire suppression system 502 may additionally be manually or automatically opened. Thus, the plumbing controller may actuate a component within the fire suppression system 502 to open a valve and enable water to be released into the interior of the home. It should be appreciated that the release of water through the fire suppression system 502 can be highly damaging to the home, and this action may be reserved for extreme or dangerous circumstances.

For example, the authorization component 108 may determine that a person or animal at the property is non-authorized because they are engaging in a violent confrontation at the property. This determination may be made through one or more of camera image data, microphone data, a communication received from emergency services, or a user sending a distress message to the surveillance system server 104. If the violent confrontation is ongoing at the property, then the surveillance system server 104 may take the action of opening all fire suppression system 502 valves in the home interior 500 in an attempt to diffuse the violent confrontation.

The surveillance system server 104 may additionally instructing a plumbing controller to open one or more faucet valves 504 or other valves within the home, such as valves for a sink faucet, bathtub faucet, showerhead, toilet, and so forth. The surveillance system server 104 may execute this action in an attempt to warn the non-authorized person that they are being watched and/or their presence within the property is known.

Figure 6:
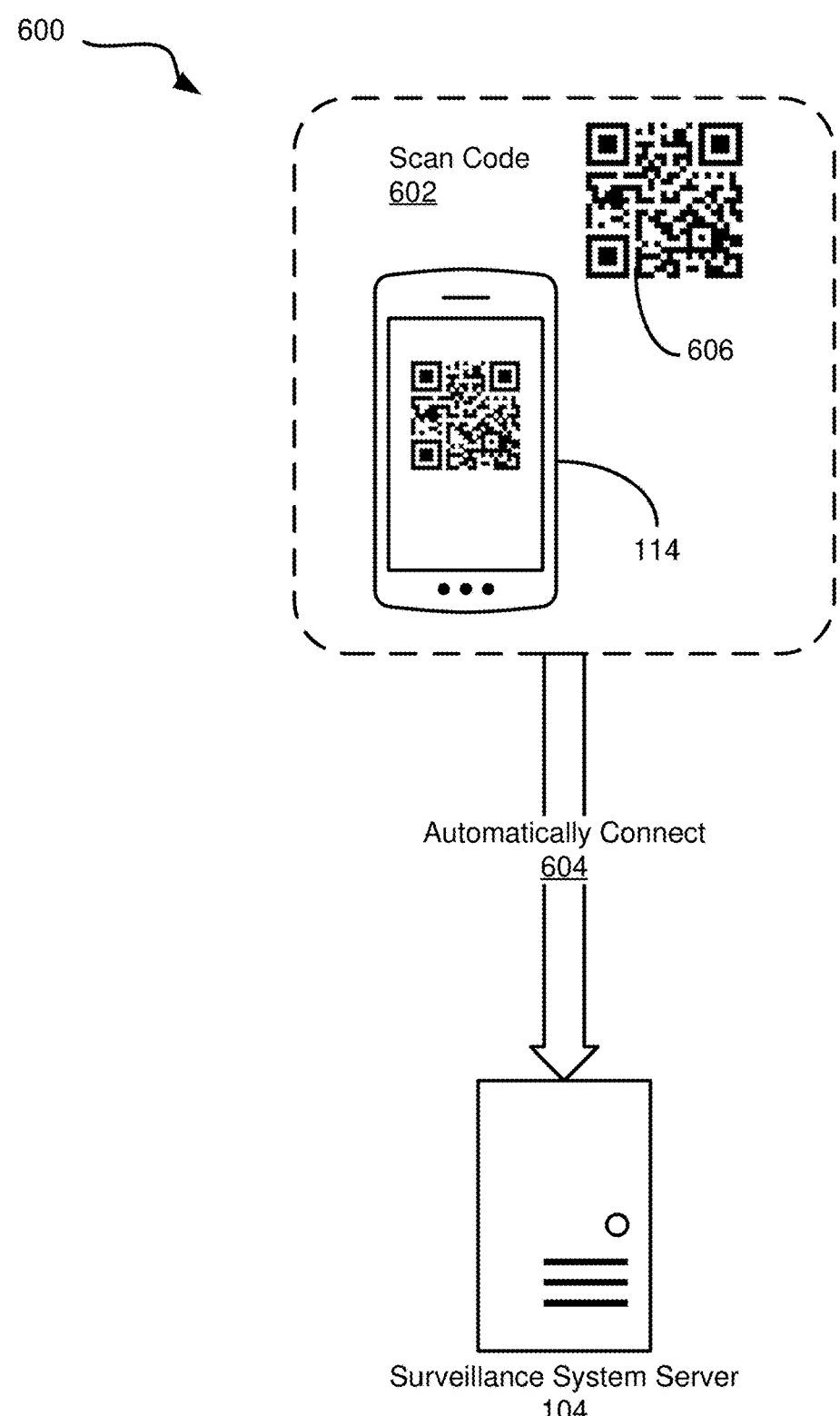
FIG. 6 is a schematic diagram of a system and method for automatically connecting to a surveillance system server.

FIG. 6 is a schematic diagram of a system 600 for communicating with the surveillance system server 104 to authorize a person to be located on the property. In an embodiment, a code 606 is provided, and a device associated with the surveillance platform 102 scans the code (see 602) to automatically connect (see 604) to the surveillance system server 104. The scanning device may include, for example, a sensor associated with a controller or control panel, a standalone sensor, and so forth. The sensor may include an image sensor or scanner for scanning a code such as the code 606 illustrated in FIG. 6. The sensor may additionally include one or more sensors for scanning biometric data, receiving a manually input code, and so forth.

The code 606 may be any scannable figure or code that is readable by a device. In an embodiment, the code 606 is a two-dimensional barcode such as a quick response (QR) code. The two-dimensional barcode can be digitally scanned by a camera or other sensor. In an embodiment, the code 606 is designed to appear like a graphic or image and the two-dimensional barcode is integrated or "hidden" in the image. The code 606 may include multiple squares that can be read by the image sensor of the personal device 114. In an embodiment, the code 606 is presented on the screen of a personal device such as a mobile phone.

In an embodiment where the code 606 is a QR code, the code includes three large squares (the three large squares can be seen in the upper-left, lower-left, and upper-right corners of the example code 606 shown in FIG. 6) that serve as alignment targets while a smaller square in a remaining corner of the code 606 (the smaller square can be seen near the lower-right corner of the example code 606 shown in FIG. 6) serves to normalize the angle with which the image sensor hits the code 606. The remaining area of the code 606 is the actual data that is converted into binary code by the personal device 114. The code 606 may include many characters worth of data. In an example where the code 606 is a 117-pixel square, the code may hold 1852 characters of data.

In an embodiment, an image sensor of the surveillance platform 102 is directed to scan the code 606, and the code 606 includes instructions for the personal device 114 to connect to the surveillance system server 104. A processor of the personal device 114 may execute the instructions stored in the code 606 to automatically connect 604 to the surveillance system server 104. When the personal device 114 connects to the surveillance system server 104, a user may interact with the surveillance system server 104 to indicate they are authorized to enter the property, alter rules or instructions to be executed the surveillance system server 104, alter the persons stored on the log of authorized persons, and so forth.

In an embodiment, in response to scanning the code 606, the surveillance system server 104 automatically identifies the person associated with the code 606. The surveillance system server 104 then references the log of authorized persons to determine whether that person is authorized to be on the property at the current time. The surveillance system server 104 then executes rules based on whether the person is authorized to be on the property, and whether the plumbing system 116 should be actuated based on the person's identity.

FIG. 7 is a schematic diagram of a method 700 for actuating one or more components of a plumbing system 116. The method 700 may be performed by the surveillance system server 104 that executes operations for the surveillance platform 102.

The method 700 begins and a computing device receives at 702 an indication from an onsite surveillance system 112 that an object of interest has been detected at a property. The object of interest may be detected in a live image or video stream captured at the property. The object of interest may first be detected by a motion sensor, and then subsequently detected by an image sensor that is activated in response to the motion sensor sensing a movement. The object of interest may further be detected based on audio data. The method 700 continues and a computing device retrieves at 704 real-time sensor data from a surveillance system located at the property. The real-time sensor data includes one or more of images, video streams, audio files, motion sensor data, and so forth.

The method 700 continues and a computing device provides at 706 an image from the real-time sensor data to a neural network trained to classify the object of interest within the image. The neural network, which may include a convolutional neural network, is trained to classify the object of interest as, for example, a human, animal, vehicle, or other object. If the neural network determines the object of interest is a human, the neural network is further trained to execute a facial recognition algorithm to determine the identity of the person. The method 700 continues and a computing device receives at 708 from the neural network an identity classification of the object of interest. The method 700 continues and a computing device, in response to determining the object of interest is a person, cross-checks at 710 the identity classification of the person against a log of authorized persons.

The method 700 may continue with a computing device, in response to determining the person is not authorized to be at the property, providing instructions at 712 to a plumbing controller to actuate one or more components of a plumbing system. The one or more components of the plumbing system may include valves for opening a flow of water to, for example, an irrigation system, a faucet, a shower, a water heater, a hose, and so forth.

FIG. 8 is a schematic diagram of a method 800 for actuating one or more components of a plumbing system 116. The method 800 may be performed by the surveillance system server 104 that executes operations for the surveillance platform 102.

The method 800 includes receiving at 802 an image frame from a surveillance camera, wherein the surveillance camera is a component of a surveillance system for a property. The method 800 includes identifying at 804 an object of interest within the image frame. The method 800 includes determining at 806 whether the object of interest depicts a non-authorized person that is not currently authorized to be located at the property by cross-checking the object of interest against a listing of authorization parameters. The method 800 includes instructing a plumbing controller to actuate one or more components of a plumbing system in response to one or more of: determining the object of interest depicts the non-authorized person located at the property, or receiving an indication from a user that the non-authorized person is not currently authorized to be located at the property.

Figure 9:
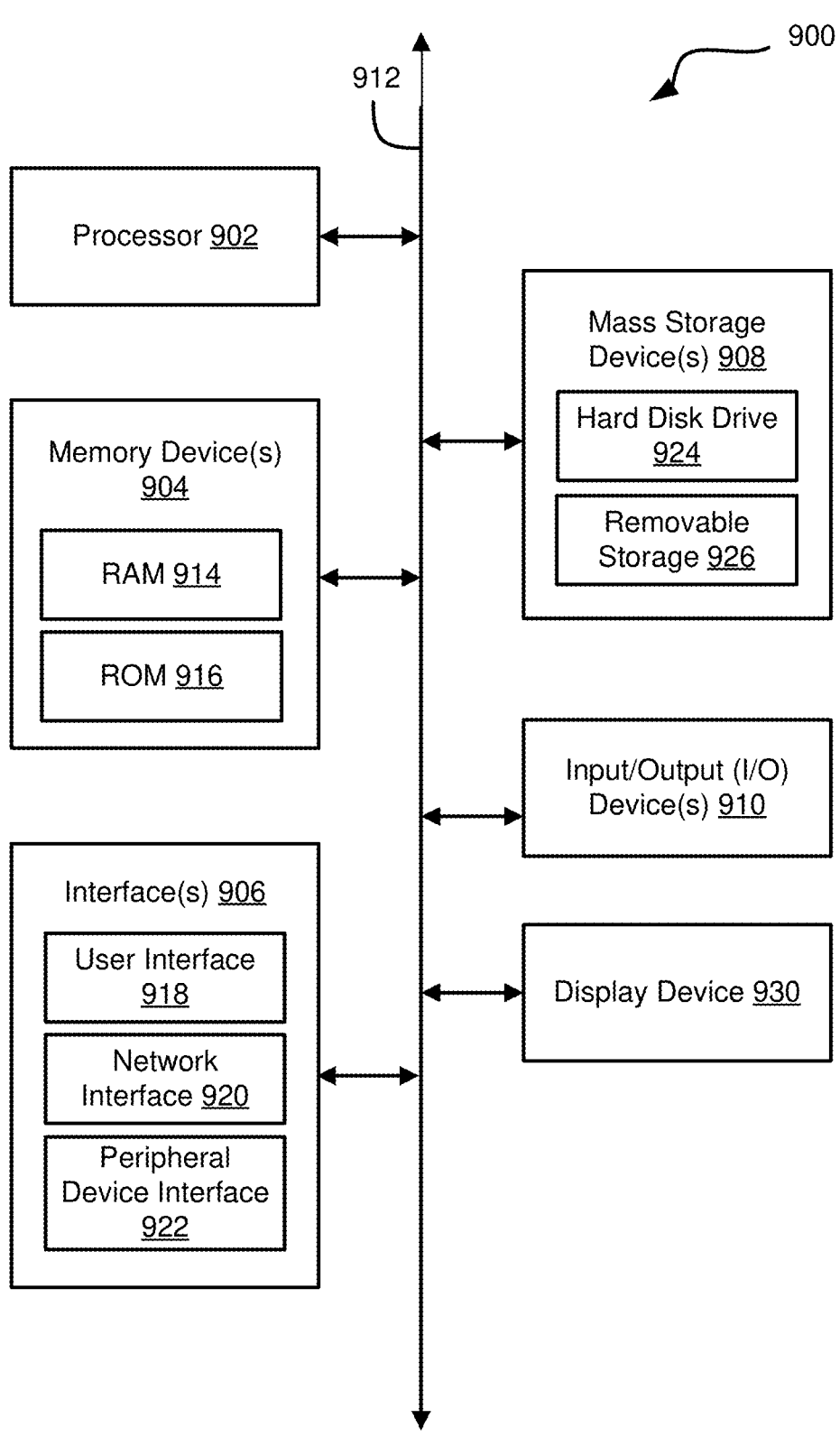
FIG. 9 illustrates components of an example computing device.

Referring now to FIG. 9, a block diagram of an example computing device 900 is illustrated. Computing device 900 may be used to perform various procedures, such as those discussed herein. Computing device 900 can perform various monitoring functions as discussed herein, and can execute one or more application programs, such as the application programs or functionality described herein. Computing device 900 can be any of a wide variety of computing devices, such as a desktop computer, in-dash computer, vehicle control system, a notebook computer, a server computer, a handheld computer, tablet computer and the like.

Computing device 900 includes one or more processor(s) 904, one or more memory device(s) 904, one or more interface(s) 906, one or more mass storage device(s) 908, one or more Input/output (I/O) device(s) 910, and a display device 930 all of which are coupled to a bus 912. Processor(s) 904 include one or more processors or controllers that execute instructions stored in memory device(s) 904 and/or mass storage device(s) 908. Processor(s) 904 may also include several types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device 908 is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 904, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

EXAMPLES

The following examples pertain to further embodiments.

Example 1 is a method. The method includes receiving an indication that an object of interest has been detected at a property. The method includes determining whether the object of interest is authorized to be located at the property at a current time. The method includes, in response to determining the object of interest is not authorized to be located at the property at the current time, providing an instruction to a plumbing controller comprising an indication for the plumbing controller to actuate one or more components of a plumbing system.

Example 2 is a method as in Example 1, wherein the object of interest is one or more of a person, an animal, or a vehicle.

Example 3 is a method as in any of Examples 1-2, wherein receiving the indication that the object of interest has been detected at the property comprises receiving sensor data from one or more sensors located at the property.

Example 4 is a method as in any of Examples 1-3, wherein the one or more sensors comprises an image sensor, a motion sensor, or a microphone.

Example 5 is a method as in any of Examples 1-4, wherein the sensor data comprising a depiction of the object of interest, wherein the depiction of the object of interest comprises one or more of an image of the object of interest or audio data of the object of interest.

Example 6 is a method as in any of Examples 1-5, wherein the sensor data is an image, and wherein the method further comprises providing the sensor data to a neural network trained to identify the object of interest within the sensor data, wherein the neural network draws a bounding box around the object of interest.

Example 7 is a method as in any of Examples 1-6, further comprising receiving from the neural network a modified image with the bounding box drawn around the object of interest.

Example 8 is a method as in any of Examples 1-7, further comprising providing image data within the bounding box to a second neural network trained to classify the object of interest within the bounding box.

Example 9 is a method as in any of Examples 1-8, further comprising receiving from the second neural network a classification of the object of interest, wherein the classification indicates whether the object of interest is a person, an animal, or a vehicle.

Example 10 is a method as in any of Examples 1-9, further comprising, in response to determining the object of interest is a person, providing the image data within the bounding box to a third neural network trained to determine an identity of the person based on a training dataset comprising a plurality of images of persons who are authorized to enter the property, wherein the training dataset is associated with a log of authorized persons for the property.

Example 11 is a method as in any of Examples 1-10, further comprising receiving from the third neural network an indication of the identity of the person.

Example 12 is a method as in any of Examples 1-11, further comprising receiving from the third neural network an indication of whether the person depicted within the bounding box of the image is a person on the log of authorized persons for the property.

Example 13 is a method as in any of Examples 1-12, further comprising, in response to determining the person depicted within the bounding box of the image is not authorized to be located at the property based on the log of authorized persons for the property, retrieving one or more rules for the property to identify a protocol for responding to the non-authorized person being located at the property.

Example 14 is a method as in any of Examples 1-13, further comprising generating instructions to actuate the one or more components of the plumbing system in response to the non-authorized person being located at the property.

Example 15 is a method as in any of Examples 1-14, wherein actuating the one or more components of the plumbing system comprises opening a valve within the plumbing system.

Example 16 is a method as in any of Examples 1-15, wherein the plumbing system comprises one or more of an indoor plumbing system and an outdoor plumbing system.

Example 17 is a method as in any of Examples 1-16, wherein the plumbing system comprises one or more valves of an irrigation system, and wherein actuating the one or more components of the plumbing system comprises opening a valve of the irrigation system.

Example 18 is a method as in any of Examples 1-17, wherein the log of authorized persons comprises an indication of one or more persons who are authorized to be at the property.

Example 19 is a method as in any of Examples 1-18, wherein the log of authorized persons comprises an indication of a time when the one or more persons are authorized to be at the property.

Example 20 is a method as in any of Examples 1-19, wherein providing the instruction to the plumbing controller comprises providing the instruction only after a user has affirmatively indicated that the one or more components of the plumbing system should be actuated.

Example 21 is a method. The method includes receiving an image frame from a surveillance camera, wherein the surveillance camera is a component of a surveillance system for a property. The method includes identifying an object of interest within the image frame. The method includes instructing a plumbing controller to actuate one or more components of a plumbing system in response to one or more of: determining that the object of interest depicts a non-authorized person located at the property; or receiving an indication from a user that the non-authorized person is located at the property.

Example 22 is a method as in Example 21, further comprising determining whether the object of interest depicts the non-authorized person by executing an algorithm trained to classify an identity of the object of interest based on the image frame.

Example 23 is a method as in any of Examples 21-22, wherein determining whether the object of interest depicts the non-authorized person further comprises cross-checking the identity of the object of interest against a listing of authorization parameters.

Example 24 is a method as in any of Examples 21-23, wherein determining that the object of interest depicts the non-authorized person comprises: classifying the object of interest as one or more of a human, an animal, or a vehicle; determining an identity of the one or more of the human, the animal, or the vehicle; and determining whether the one or more of the human, the animal, or the vehicle is allowed to be located at the property based on a listing of authorization parameters.

Example 25 is a method as in any of Examples 21-24, wherein determining whether the object of interest depicts the non-authorized person comprises determining based on a listing of authorization parameters; and wherein the listing of authorization parameters comprises a listing of explicitly non-authorized persons.

Example 26 is a method as in any of Examples 21-25, wherein determining whether the object of interest depicts the non-authorized persons comprises determining based on a listing of authorization parameters, and wherein the listing of authorization parameters comprises one or more of: a timeframe when persons are not authorized to enter the property; a portion of the property where persons are not authorized to be located; or a listing of animal types that are not authorized to be located at the property.

Example 27 is a method as in any of Examples 21-26, wherein the non-authorized person is one or more of a human, an animal, or a vehicle.

Example 28 is a method as in any of Examples 21-27, wherein the surveillance system further comprises one or more of a noise sensor, a microphone, a motion sensor, a door sensor, or a window sensor; and wherein the method further comprises corroborating data determined based on the image frame with data received from the one or more of the noise sensor, the microphone, the motion sensor, the door sensor, or the window sensor.

Example 29 is a method as in any of Examples 21-28, wherein determining the object of interest depicts the non-authorized person comprises determining that a violent dispute is currently occurring at the property based on one or more of a video stream output by the surveillance camera or an audio stream output by a microphone.

Example 30 is a method as in any of Examples 21-29, wherein receiving the indication from the user that the non-authorized person is located at the property comprises receiving an alert via one or more of a mobile phone application, a surveillance controller located at the property, or a communication channel established with an emergency response force.

Example 31 is a method as in any of Examples 21-30, wherein instructing the plumbing controller to actuate the one or more components of the plumbing system comprises instructing an irrigation controller to open a valve for one or more irrigation zones.

Example 32 is a method as in any of Examples 21-31, wherein instructing the plumbing controller to actuate the one or more components of the plumbing system comprises instructing the plumbing controller to open a valve in an interior fire suppression system.

Example 33 is a method as in any of Examples 21-32, wherein instructing the plumbing controller to actuate the one or more components of the plumbing system comprises instructing the plumbing controller to open a valve and release water for one or more of a sink faucet, a showerhead, a bathtub faucet, or a toilet.

Example 34 is a method as in any of Examples 21-33, further comprising determining whether the object of interest depicts the non-authorized person by: processing the image frame with a neural network configured to draw a bounding box around the object of interest; and executing a facial recognition algorithm on the image data within the bounding box to determine whether the object of interest matches stored image data depicting the non-authorized person, wherein the stored image data is stored in association with a listing of authorization parameters.

Example 35 is a method as in any of Examples 21-34, wherein instructing the plumbing controller to actuate the one or more components of the plumbing system comprises instructing the plumbing controller to open a valve and release water with the plumbing system; and wherein the method further comprises instructing the plumbing controller to continue releasing water with the plumbing system until the non-authorized person leaves the property.

Example 36 is a method as in any of Examples 21-35, wherein the non-authorized person is an animal located at the property; and wherein instructing the plumbing controller to actuate the one or more components of the plumbing system comprises instructing an irrigation controller to open a valve for one or more irrigation zones at the property.

Example 37 is a method as in any of Examples 21-36, further comprising: receiving a video stream from the surveillance camera in real-time; and determining that the object of interest depicts the non-authorized person, wherein the determining comprises processing the video stream with a machine learning algorithm configured to predict whether the non-authorized person is engaging in behavior that is classified as suspicious.

Example 38 is a method as in any of Examples 21-37, wherein a listing of suspicious behaviors is stored on a database, and wherein the listing of suspicious behaviors comprises one or more of: the non-authorized person peering into one or more windows at the property; the non-authorized person attempting to open a locked door at the property for a threshold duration of time; the non-authorized person breaking a window at the property; or the non-authorized person loitering at the property for a threshold duration of time within a certain timeframe.

Example 39 is a method as in any of Examples 21-38, further comprising automatically sending an alert to an emergency service in response to determining that the object of interest depicts the non-authorized person located at the property.

Example 40 is a method as in any of Examples 21-39, further comprising automatically sending a query to a user requesting confirmation that the non-authorized person located at the property is not currently authorized to be at the property; and in response to receiving confirmation from the user that the non-authorized person is not currently authorized to be at the property, instructing the plumbing controller to actuate the one or more components of the plumbing system.

Example 41 is non-transitory computer readable storage medium storing instructions for execution by one or more processors, wherein the instructions comprise any of the method steps of Examples 1-40.

Example 42 is a system. The system includes a server in communication with a surveillance controller at a property. The server executes instructions stored in non-transitory computer readable storage medium, wherein the instructions comprise any of the method steps of Examples 1-40.

Example 43 is a system. The system includes a surveillance controller. The system includes a camera in communication with the surveillance controller. The system includes an actuator for a plumbing valve in communication with the surveillance controller, wherein the surveillance controller can provide instructions to the actuator to open or close the plumbing valve.

Example 44 is a system as in Example 43, wherein the surveillance controller comprises a processor for executing instructions, wherein the instructions comprise any of the method steps of Examples 1-40.

Example 45 is a system as in Example 43, wherein the surveillance controller is in communication with a server, wherein the server comprises a processor to execute instructions, and wherein the instructions comprise any of the method steps of Examples 1-40.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly various kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, televisions, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
receiving an image frame from a surveillance camera, wherein the surveillance camera is a component of a surveillance system for a property;
identifying an object of interest within the image frame; and
instructing a plumbing controller to actuate one or more components of a plumbing system in a first zone associated with the property in response to:
determining, at an image analysis component, that the object of interest depicts a non-authorized person located at the property; and
identifying the non-authorized person is located in the first zone, wherein the first zone is one of a plurality of zones associated with the property.

2. The method of claim 1, further comprising determining whether the object of interest depicts the non-authorized person by executing an algorithm trained to classify an identity of the object of interest based on the image frame.

3. The method of claim 2, wherein determining whether the object of interest depicts the non-authorized person further comprises cross-checking the identity of the object of interest against a listing of authorization parameters.

4. The method of claim 1, wherein determining that the object of interest depicts the non-authorized person comprises:
classifying the object of interest into one classification wherein the one classification is one of a plurality of classifications including a human, an animal, and a vehicle;
determining an identity of the one or more of the human, the animal, or the vehicle; and
determining whether the one or more of the human, the animal, or the vehicle is allowed to be located at the property based on a listing of authorization parameters.

5. The method of claim 1, wherein determining whether the object of interest depicts the non-authorized person comprises determining based on a listing of authorization parameters; and
wherein the listing of authorization parameters comprises a listing of explicitly non-authorized persons.

6. The method of claim 1, wherein determining whether the object of interest depicts the non-authorized persons comprises determining based on a listing of authorization parameters, and wherein the listing of authorization parameters comprises one or more of:

a timeframe when persons are not authorized to enter the property;

a portion of the property where persons are not authorized to be located; or a listing of animal types that are not authorized to be located at the property.

7. The method of claim 1, wherein the non-authorized person is one or more of a human, an animal, or a vehicle.

8. The method of claim 1, wherein the surveillance system further comprises one or more of a noise sensor, a microphone, a motion sensor, a door sensor, or a window sensor; and wherein the method further comprises corroborating data determined based on the image frame with data received from the one or more of the noise sensor, the microphone, the motion sensor, the door sensor, or the window sensor.

9. The method of claim 1, wherein determining the object of interest depicts the non-authorized person comprises determining that a violent dispute is currently occurring at the property based on one or more of a video stream output by the surveillance camera or an audio stream output by a microphone.

10. The method of claim 1, further comprising:

receiving an indication from a user that the non-authorized person is located at the property; and wherein receiving the indication from the user that the non-authorized person is located at the property comprises receiving an alert via one or more of a mobile phone application, a surveillance controller located at the property, or a communication channel established with an emergency response force.

11. The method of claim 1, wherein instructing the plumbing controller to actuate the one or more components of the plumbing system comprises instructing an irrigation controller to open a plurality of valves for more than one of the plurality of zones.

12. The method of claim 1, wherein instructing the plumbing controller to actuate the one or more components of the plumbing system comprises instructing the plumbing controller to open a valve in an interior fire suppression system.

13. The method of claim 1, wherein instructing the plumbing controller to actuate the one or more components of the plumbing system comprises instructing the plumbing controller to open a valve and release water for one or more of a sink faucet, a showerhead, a bathtub faucet, or a toilet.

14. The method of claim 1, further comprising determining whether the object of interest depicts the non-authorized person by:

processing the image frame with a neural network configured to draw a bounding box around the object of interest; and executing a facial recognition algorithm on the image data within the bounding box to determine whether the object of interest matches stored image data depicting the non-authorized person, wherein the stored image data is stored in association with a listing of authorization parameters.

15. The method of claim 1, wherein instructing the plumbing controller to actuate the one or more components of the plumbing system comprises instructing the plumbing controller to open a valve and release water with the plumbing system; and wherein the method further comprises instructing the plumbing controller to continue releasing water with the plumbing system until the non-authorized person leaves the property.

16. The method of claim 1, wherein the non-authorized person is an animal located at the property.

17. The method of claim 1, further comprising:

receiving a video stream from the surveillance camera in real-time; and determining that the object of interest depicts the non-authorized person, wherein the determining comprises processing the video stream with a machine learning algorithm configured to predict whether the non-authorized person is engaging in behavior that is classified as suspicious.

18. The method of claim 17, wherein a listing of suspicious behaviors is stored on a database, and wherein the listing of suspicious behaviors comprises:

the non-authorized person peering into one or more windows at the property;

the non-authorized person attempting to open a locked door at the property for a threshold duration of time;

the non-authorized person breaking a window at the property; and the non-authorized person loitering at the property for a threshold duration of time within a certain timeframe.

19. The method of claim 1, further comprising automatically sending an alert to an emergency service in response to determining that the object of interest depicts the non-authorized person located at the property.

20. The method of claim 1, further comprising automatically sending a query to a user requesting confirmation that the non-authorized person located at the property is not currently authorized to be at the property; and in response to receiving confirmation from the user that the non-authorized person is not currently authorized to be at the property, instructing the plumbing controller to actuate the one or more components of the plumbing system.

* * * * *